United States Patent Office 3,472,550
Patented Oct. 14, 1969

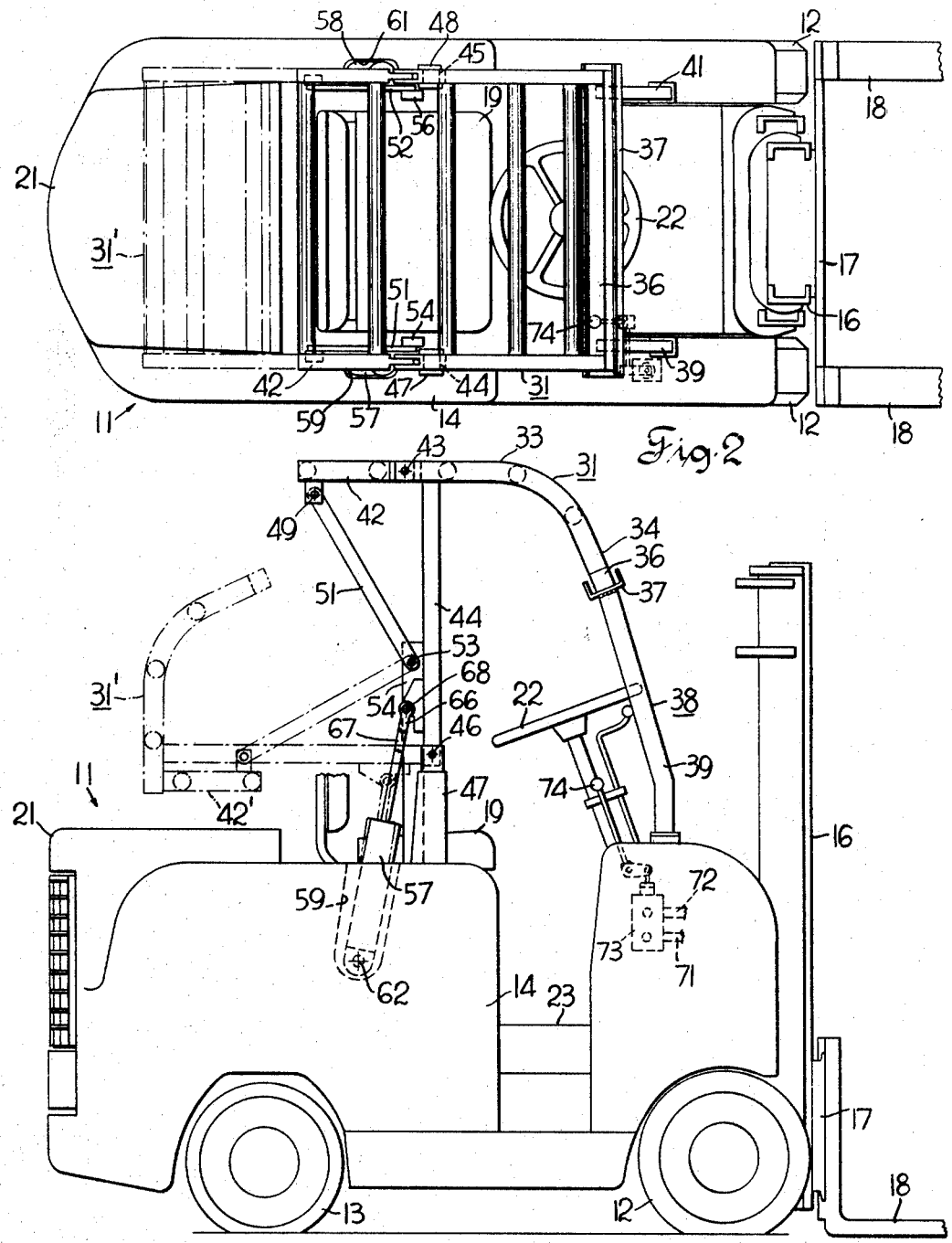

3,472,550
RETRACTABLE OVERHEAD GUARD
George P. Marco, Homewood, Ill., assignor to Allis-Chalmers Manufacturing Company, Milwaukee, Wis.
Filed Dec. 11, 1967, Ser. No. 689,376
Int. Cl. B60j 7/12; B60r 21/02
U.S. Cl. 296—102                                    5 Claims

ABSTRACT OF THE DISCLOSURE

The overhead guard is pivoted rearwardly by power means to a lowered position behind the operator's station where it is disposed within the confines of the truck. During rearward pivoting, a rear section of the top folds under to permit reduction of the height of the overhead guard in its retracted position.

---

This invention relates to an overhead guard for a lift truck and particularly relates to an overhead guard which can be quickly retracted to a reduced overall height, without increasing the length of the truck, to allow the truck to operate in minimum overhead clearance areas.

Overhead guards for lift trucks are recognized as desirable safety means to protect the truck operator against injury from falling objects such as part of an elevated load or the like. The overhead guard is designed to be high enough to permit the operator to stand on the truck floorboard during entrance to and exit from the operator's station. This guard height on many lift trucks is too high to clear doorways of box cars and some low doorways on factories and storage buildings. Multiple section masts have been designed to have a collapsed height low enough to clear low doorways of boxcars and the like, however, the usual overhead guard is often too high to clear the doorway. Hence the need for an overhead guard which is easily and quickly retracted or callapsed to a height not greater than the mast height. It is also desirable to make the overhead guard so easy to retract and raise that the operator can effect these functions during lift truck operator without leaving his station and without stopping the truck.

In providing an overhead guard which takes care of the problems hereinbefore mentioned, it is also important to keep the retracted guard within the horizontal confines of the truck so that the guard does not catch on stationary structural members or the like during maneuvering of the truck in close quarters.

It is an object of this invention to provide an overhead guard for a lift truck which is quickly retractable to a reduced height within the horizontal confines of the truck.

It is a further object of this invention to provide an overhead guard for a lift truck which can be retracted by power means while the operator is driving the truck.

It is a further object of this invention to provide an overhead guard for a lift truck which obviates the hereinbefore outlined problems in an entirely satisfactory manner.

These and other objects and advantages will be apparent to those familiar with the lift truck art when the following description is read in conjunction with the drawings in which:

FIG. 1 is a side view of a lift truck incorporating this invention and

FIG. 2 is a top view of the truck shown in FIG. 1.

Referring to the drawings the lift truck 11 includes drive wheels 12 and steerable wheels 13 supporting a chassis 14. A multisection upright mast 16 is mounted on the front end of chasis 14 and mounts a carriage 17 with forks 18 for reciprocable raising and lowering of loads. The illustrated mast is relatively low in height when collapsed, as illustrated. At this low height the mast will clear low doorways such as those found on railroad boxcars. An operator's station including a seat 19 is located ahead of the counterweight 21 and near the central part of the truck. The steering wheel 22 and other drive operated controls are located at the front of the chassis. The engine, not shown, is located below and to the rear of the operator's station and a transmission, not shown, is located below the floorboard 23.

In order to provide overhead guard protection to the operator and nevertheless permit operation of the truck in minimum overhead clearance areas, where overhead protection is of diminished importance, a retractable overhead guard 31 is provided which retracts rearwardly, under power, to the position shown by broken lines 31'. The guard includes a front section 33, the forward end 34 of which extends downwardly and forwardly terminating in a transverse beam 36. The transverse beam is in thrust transmitting relation to an upward opening transverse channel 37 welded to 39, 41 rigidly fixed to the chassis 14 at their bottom end. The legs 39, 41 and channel 37 constitute an upstanding support structure whose height is less than that of the mass 16. The overhead guard includes a horizonally disposed rear section 42 pivotally connected at its front end to the rear of the front section on a transverse axis 43. The front section has a pair of laterally spaced and downwardly depending legs 44, 45 secured thereto. The lower ends of the legs 44, 45 are pivotally connected on a transverse axis 46 to fixed upright supports 47, 48 on the chassis. The rear end of the rear section 42 of the overhead guard 31 is pivotally connected on a transverse axis 49 to a pair of transversely spaced links 51, 52 which extend downwardly and forwardly to their bottom ends which are pivotally connected on a transverse axis 53 to a pair of fixed upright posts 54, 56 on the chassis 14.

The overhead guard 31 is raised and lowered by a pair of power actuators in the form of double acting hydraulic rams 57, 58, the cylinder components of which are disposed in wells 59, 61 in the counterweight 21 and pivotally connected to chassis 14 on a transverse pivot axis 62. The piston components of rams 57, 58 include rods 66, 67, the upper ends of which are pivotally connected to legs 44, 45 on a transverse axis 68. When the ram is contracted the overhead guard will be retracted to the position shown in broken lines 31'. In this retracted position the rear section 42 of the top of the guard is folded under the rest of the guard to the position indicated by reference number 42'. The folding action is effected by operation of links 51, 52 due in part to the vertical separation of pivot axes 53 and 46. The pivoting under of the rear section 42 during retraction permits the overhead guard to retract to a height no greater than the height of the collapsed mast 16. The rams are connected in parallel to ram supply conduits 71, 72 of control valve 73, which is operated by manual control lever 74 located at the operator's station. The control valve has the conventional positions of raise, lower and hold.

In operation, the lift truck operator is afforded overhead protection when operating in a high load stacking area and when delivering loads to or removing loads from a boxcar or the like the overhead guard is retracted by the operator through his movement of manual control lever 74, such movement of lever 74, of course, effects relative movement of the relatively extensible and contractible components of the rams 57, 58, that is, the cylinder and piston components. This can be accomplished while the truck is moving, thus avoiding lost work time and making the operation so easy that the operator will not neglect to cause the guard to be raised again to its protective position when overhead clearance permits.

There are no coupling members to unfasten or refasten in the guard retracting and raising operations. The forward end of the guard 31 merely abuts the channel 37, on support structure 38, so as to be in vertical load transmitting relation thereto.

As shown in FIG. 2, the overhead guard, in its retracted position, is disposed with the horizontal confines or outline of the truck. Thus it is not subject to damage as some prior art overhead guard have been due to their extending slightly beyond the rear of the truck in their lowered position.

The embodiments of the invention in which an exclusive property or privilege is claimed are defined as follows:

1. In a lift truck having a chassis, an operator's station on the front of said chassis and an upright mast structure located at the front of the said chassis forwardly of said operator's station, the combination comprising:

an overhead guard above said operator's station having front and rear sections pivotally interconnected on a first transverse axis and a pair of laterally spaced legs secured to and extending downwardly from said front section, means pivotally connecting the bottom of said legs to said chassis on a second transverse axis, an upright support structure on said chassis at the front of said operator's station extending upwardly to a height not greater than the height of said mast, a forwardly and downwardly extending part on said front section in vertical load transmitting relation to said support structure, a pair of links having their bottom ends pivotally connected to said chassis on a third transverse axis spaced vertically between said first and second axes and having their top ends pivotally connected to said rear section on a fourth transverse axis spaced rearwardly of said first axis and rearwardly and above said third axis, and means releasably maintaining said overhead guard in its normal upright position wherein said part of said front section is in load transmitting relation to said support structure.

2. The invention of claim 1 wherein said means includes a power operated actuator having a pair of relatively extensible and contractible components connected, respectively, to said chassis and one of said legs.

3. The invention of claim 2 wherein said actuator is a double acting hydraulic ram.

4. The invention of claim 1 wherein the overhead guard retracts rearwardly and downwardly to a reduced height not greater than the height of said mast.

5. The invention of claim 4 wherein said overhead guard in its retracted position is within the horizontal confines of the truck.

References Cited

UNITED STATES PATENTS

| | | | |
|---|---|---|---|
| 2,919,156 | 12/1959 | Dodge | 296—107 |
| 3,289,871 | 12/1966 | Le Tourneau et al. | 296—102 |
| 3,336,074 | 8/1967 | Barnes et al. | 296—102 |

LEO FRIAGLIA, Primary Examiner

JOEL E. SIEGEL, Assistant Examiner

U.S. Cl. X.R.

280—150; 296—107